United States Patent
Bengtsson et al.

(10) Patent No.: US 7,844,287 B2
(45) Date of Patent: Nov. 30, 2010

(54) AUTOMATIC SPREAD OF APPLICATIONS

(75) Inventors: Henrik Bengtsson, Lund (SE); Troed Sangberg, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 236 days.

(21) Appl. No.: 11/532,253

(22) Filed: Sep. 15, 2006

(65) Prior Publication Data

US 2007/0265023 A1 Nov. 15, 2007

Related U.S. Application Data (63) Continuation-in-part of application No. 11/469,733, filed on Sep. 1, 2006, now abandoned.

(60) Provisional application No. 60/747,502, filed on May 17, 2006, provisional application No. 60/806,420, filed on Jun. 30, 2006.

(51) Int. Cl.
*H04W 4/14* (2009.01)
*H04W 4/20* (2009.01)
*H04M 3/00* (2006.01)
*H04M 3/42* (2006.01)

(52) U.S. Cl. .................. 455/466; 455/418; 455/414.1

(58) Field of Classification Search .............. 455/466, 455/418, 414.1, 455, 458
See application file for complete search history.

(56) References Cited

U.S. PATENT DOCUMENTS

| | | | | |
|---|---|---|---|---|
| 6,078,820 A | | 6/2000 | Wells et al. | |
| 6,125,281 A | * | 9/2000 | Wells et al. | 455/466 |
| 6,273,622 B1 | * | 8/2001 | Ben-David | 709/230 |
| 7,113,981 B2 | * | 9/2006 | Slate | 709/217 |
| 7,502,335 B2 | * | 3/2009 | Lin | 370/278 |
| 2003/0074403 A1 | * | 4/2003 | Harrow et al. | 709/203 |

(Continued)

FOREIGN PATENT DOCUMENTS

EP 1 494 432 A2 1/2005

(Continued)

OTHER PUBLICATIONS

International Search Report and Written Opinion issued in corresponding PCT application No. PCT/EP2006/010304, 11 pages.

(Continued)

*Primary Examiner*—Dwayne D Bost
*Assistant Examiner*—Michael Mapa
(74) *Attorney, Agent, or Firm*—Harrity & Harrity, LLP (57) ABSTRACT

The present invention relates to a method in a first communications device for sharing an application with a second communication device. The method comprises the steps of: Sending a first short message service (SMS) to the second device. The first SMS comprises a link to a place from where the application can be downloaded into the second device. The first SMS comprises an identity for the second device to use for initiating an IP connection between the first device and the second device and the second device. The method comprises the further step of being connected by the second device for setting up an IP connection between the first device and the second device. The method comprises the further step of communicating with the second device in an IP connection sharing the application.

21 Claims, 3 Drawing Sheets

U.S. PATENT DOCUMENTS

| | | | |
|---|---|---|---|
| 2003/0139193 A1* | 7/2003 | Buckley | 455/466 |
| 2004/0059910 A1* | 3/2004 | Allison et al. | 713/154 |
| 2005/0021633 A1* | 1/2005 | Venkatraman et al. | 709/206 |
| 2005/0033852 A1* | 2/2005 | Tenhunen | 709/229 |
| 2005/0058094 A1* | 3/2005 | Lazaridis et al. | 370/328 |
| 2005/0250470 A1* | 11/2005 | Wen et al. | 455/405 |
| 2005/0250507 A1* | 11/2005 | Leung et al. | 455/452.1 |
| 2005/0288045 A1* | 12/2005 | Yang et al. | 455/466 |
| 2006/0035655 A1* | 2/2006 | Lonnfors et al. | 455/517 |
| 2007/0129014 A1* | 6/2007 | Bertorello et al. | 455/41.2 |
| 2007/0250614 A1* | 10/2007 | Szabo | 709/223 |

FOREIGN PATENT DOCUMENTS

| RU | 2 196 393 C2 | 1/2003 |
|---|---|---|
| WO | WO 2005/017660 A2 | 2/2005 |

OTHER PUBLICATIONS

U.S. Appl. No. 11/469,733, Henrik Bengtsson et al.: "Automatic Spread of Applications", filed Sep. 1, 2006.

* cited by examiner

US 7,844,287 B2

AUTOMATIC SPREAD OF APPLICATIONS

RELATED APPLICATIONS

This application is a continuation-in-part of U.S. patent application Ser. No. 11/469,733 filed on Sep. 1, 2006, the contents of which are hereby incorporated by reference. This application also claims priority from U.S. Provisional Application 60/747,502, filed May 17, 2006, and titled "Automatic Spread of Applications", and from U.S. Provisional Application 60/806,420, filed Jun. 30, 2006, and titled "Automatic Spread of Applications Method", the contents of which are hereby incorporated by reference.

TECHNICAL FIELD

The present invention relates generally to a first communication device and a method in a first communication device. In particular it relates to sharing an application with a second communication device in an IP connection.

DESCRIPTION OF RELATED ART

The telecom industry is slow in introducing new features and new applications in communication devices such as mobile phones. That is since it always requires standardization, and implementation, and interoperability (IOP) testing and role out in the operator networks. Today the only way to introduce a new feature requiring a new application is to first standardize the new feature and then include the new application in all new mobile phones. This results in the problem that mobile phones that are already on the market are excluded from the introduction of new features and applications.

SUMMARY

The object of the invention is to provide a mechanism for a communication device that makes it easier and faster for a first communication device to share an application with a second communication device.

In accordance with the present invention, the object is achieved by a method in a first communications device (first device) for sharing an application with a second communication device (second device). The first device comprises the application. The method comprises the steps of: Sending a first short message service (SMS) to the second device. The first SMS comprises a link to a place from where the application can be downloaded into the second device if the second device does not already comprise the application. The first SMS comprises an identity for the second device to use for initiating an IP connection between the first device and the second device. The method comprises the further step of being connected by the second device for setting up an IP connection between the first device and the second device. The second device having downloaded the application by means of the link received in the first SMS, if the second device did not already comprise the application. The second device has connected to the first device by means of the identity received in the first SMS. The method comprises the further step of communicating with the second device in an IP connection sharing the application.

In accordance with the present invention, the object is also achieved by a first communication device (first device) comprising an application. The first device further comprises a sending unit adapted to send a first short message service (SMS) to a second communication device (second device). The first SMS comprises a link to a place from where the application can be downloaded into the second device if the second device does not already comprises comprise the application. The first SMS further comprises an identity for the second device to use for initiating an IP connection between the first device and the second device. The first device further comprises an IP connection point adapted to being connected to by the second device for setting up an IP connection between the first device and the second device. The second device is adapted to download the application by means of the link received in the first SMS if the second device does not already comprise the application and which second device adapted to connect to the first device by means of the identity received in the first SMS. The IP connection point is further adapted to communicate with the second device in an IP connection sharing the application.

Since the first device sends a link to a place from where the application can be downloaded into the second device and an identity for the second device to use for initiating an IP connection between the first device and the second device in an SMS to the second device, the second device can download the application, start an IP connection between the first device and second device and the first and second device can start communication on the IP connection, sharing the application.

An advantage of the present invention is that the application can be spread automatically into a huge amount of users, without the cost of maintaining a large server park.

Another advantage of the present invention is that no standardization or user configuration is required.

A further advantage is that the present invention is operator independent.

DETAILED DESCRIPTION OF THE INVENTION

Figure 1:
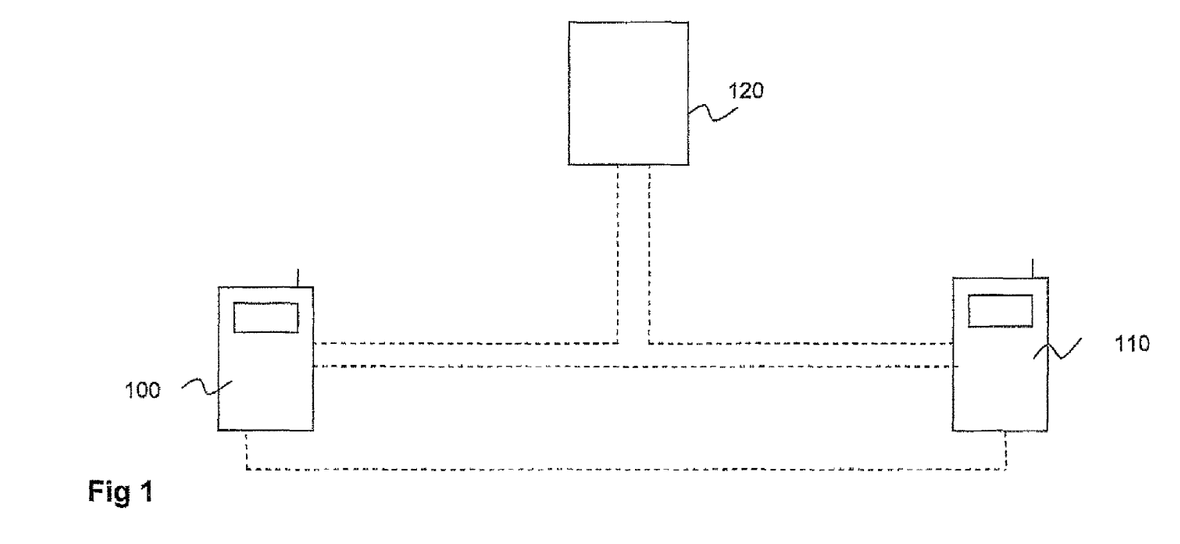
FIG. 1 is a schematic block diagram illustrating a first device communicating with a second device according to the present invention.

FIG. 1 shows a first communication device 100, from now on called the first device 100, adapted to communicate with a second communication device 110, from now on called the second device 110. The first device 100 and second device 110 are comprised in a communication system, such as e.g. a radio communication system using technologies such as e.g. Global System for Mobile communication (GSM) and Wideband Code Division Multiple Access (WCDMA), a Plain Old Telephone Service system (POTS), or the Internet. The first device 100 and second device 110 may be e.g. a portable device, a mobile phone, a Personal Digital Computer, a POTS device, a computer or any other communication device. The first device 100 and second device 110 further comprises a respective telephone number or some other kind of address that make them capable of communicating via Short Message Service (SMS) or similar, using a SMS bearer or similar bearer that may be circuit switched or packet switched. SMS in this document also comprises Multimedia Messaging Service (MMS). For example, the first device 100 and second device 110 may comprise a Subscriber Identity Module (SIM) card or similar function such as Universal Mobile Telecommunications System SIM (USIM) or IP Multimedia Subsystem SIM (ISIM) comprising the telephone number or the other kind of address to the device. The present method uses the feature of a communication system that devices with a SIM card or similar, or a telephone number can directly be contacted as soon as they are turned on, via the SMS (or similar) bearer.

A computer with a SIM (or ISIM or USIM) card can today connect to the internet using e.g. General Packet Radio Service (GPRS), and can send and receive SMS messages using GSM. Such a computer can potentially also be connected to the internet through a landline cable, such as e.g. Asymmetric Digital Subscriber Line (ADSL) or a broadband access. With the SIM (or USIM, or ISIM or similar) card it has an identity which makes it reachable. This identity can be its Mobile Station International ISDN Number (MSISDN) number (ISDN stands for Integrated Service Digital Network), such as in the SMS case, or it can be a Session Initiation Protocol Uniform Resource Identifier (SIP URI) as it is the case with ISIM (ISIM is the SIM card application used in the IMS case). The device can e.g. send and receive SMS messages over the GSM network or alternatively over the land line cable over the internet with a direct connection to the Short Message Service Centre (SMSC).

As indicated above, the service used to connect to the second device, can be SMS or similar. The SMS service is commonly known and needs no further clarification. It is not unlikely that the SMS service over time is replaced by something else. The unique characteristic of the SMS service is that it is always available as soon as the SIM (or USIM or ISIM) card is installed into the device. A similar service should have the same characteristics but can be more efficiently implemented by using e.g. the SIP URI identity instead of the MS ISDN. This present invention covers also alternative services to SMS.

The present method may further make use of an SMS feature defined in some communication systems, such as radio communications systems, which directly addresses a specified port, not appearing in the device's normal SMS inbox and thereby auto start certain applications. The second device 110 further supports download of applications such as e.g. Java or UIQ devices. JAVA is an object oriented programming language developed at Sun Microsystems. The Java language is used extensively on the World Wide Web (www). UIQ 3 is a software platform, pre-integrated and tested with the operating system Symbian OS v9, providing core technologies and services such as telephony and networking.

The first device 100 comprises an application. The application may be an application of the type that it can be downloaded from e.g. a server. The application can be written in any open environment such as in e.g. Java or UIQ, making it possible to install the application. The application may e.g. be such that it enables real time communication between the first device 100 and the second device 110, e.g. voice, pictures, video or any other communication.

The user of the first device 100 wishes to share the application with the user of the second device 110 using an IP connection. E.g. to talk to the user of the second device 110, using an Internet Protocol (IP) telephony application, show a picture for the user of the second device 110 using a picture viewer application, run an instant messaging session etc. In order to make this work, the second device 110 requires comprising the same application. The first device 100 wishes to provide the second device 110 with the application if the second device 110 does not already comprise the application.

The first device 100 may comprise a public IP address. In current telecom systems and on the internet, the number of IP addresses is limited. Therefore there are not enough addresses to provide public IP addresses to every user, and most users have private IP addresses. In the next version of IP, the IP v6 version, close to infinite numbers of IP addresses will exist, allowing for everyone to have public IP addresses.

If the first device 100 does not comprises a public IP address, the consequence is that a user of the first device 100 can not be directly contacted by the second device 110. Instead the second device 110 contacts of a server 120, using an IP address of the server. The server 120 completes the IP connection to the first device 100. How this is performed will be described later on. Therefore there is provided, one embodiment wherein the first device 100 has a public IP address and no server is used as will be described below with reference to FIG. 2 and another embodiment wherein the first device 100 not has any public IP address and a server 120 is involved, which embodiment will be described further on with reference to FIG. 3. The server 120 may be a general server only connecting those devices without public IP numbers, but could also contain application specific functionality. The application in the first device 100 knows the IP address of the server 120. When the second device 110 comprises the application, the IP address of the server 120 is known to the application of the second device 110. The public IP address of the first device 100 will from now on be called the IP address of the first device 100. The IP address of the first device 100 represents an identity, identifying the first device 100, which identity is used by the second device 110 for initiating an IP connection between the first device 100 and the second device 110.

The IP address of the server 120 is used by the first device 100 to set up an IP connection to the server 120. The first device 100 sends a request to the server 120, requesting a registration and an identity of the connection. I.e., the first device 100 who wishes to contact the second device 110 must register some identification of the wished connection in the server 120. The identity is sent by the first device 100 in an SMS to the second device 110. When the second device 110 contacts the server 120 it informs the server 120 about the identity. The server 120 then knows to which existing connection the second device 110 shall be connected. The identity may e.g. be a 128 bit hash code or any other unique identifier of the connection.

Figure 2:
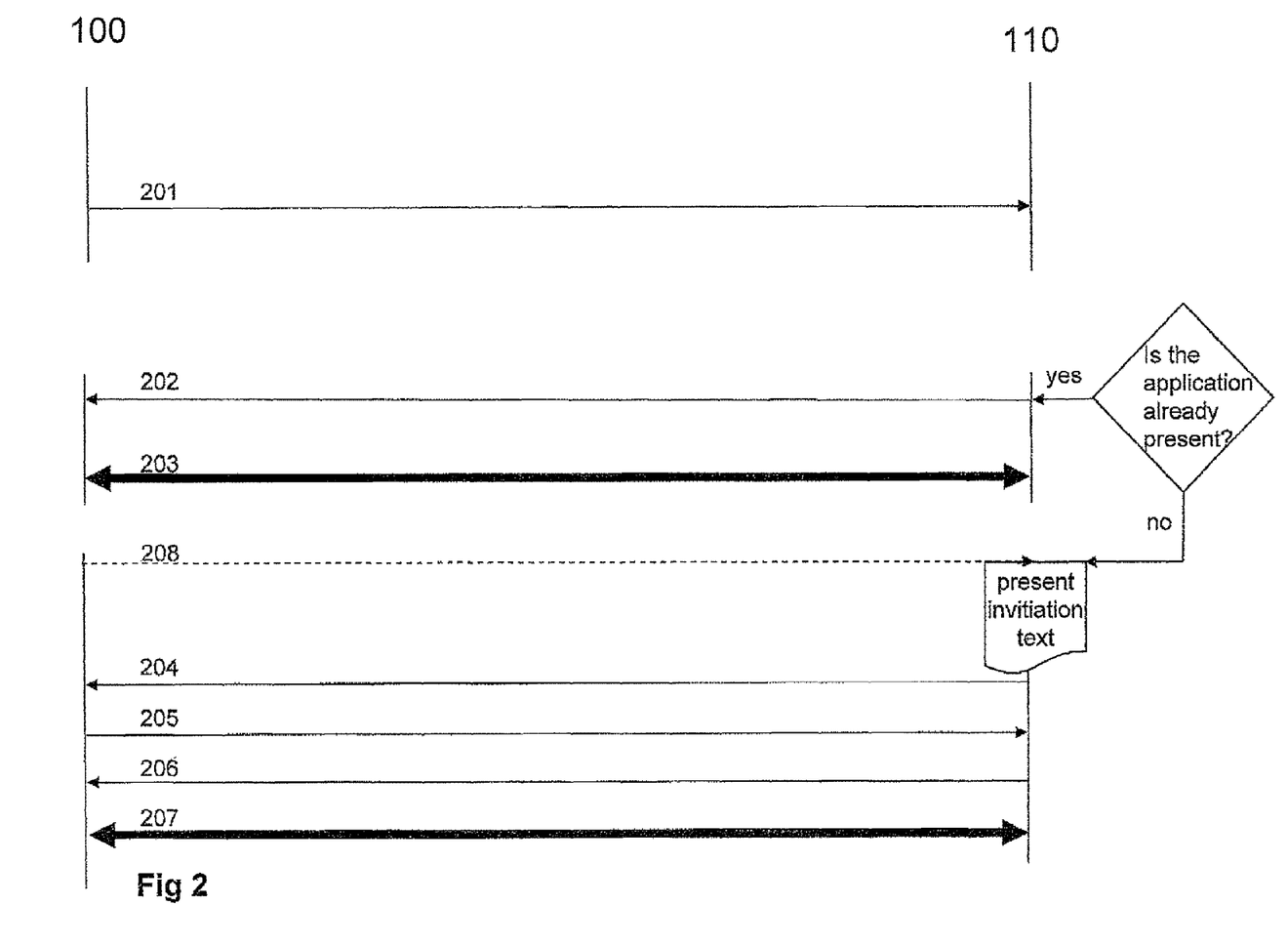
FIG. 2 is a combined signaling scheme and flowchart illustrating an embodiment of the present invention.

FIG. 2 is a combined signaling scheme and flowchart describing a method for providing the second device 110 with an application and sharing the application with the second device 110. In this embodiment of the method the first device 100 has a public IP address. The method comprises the following steps:

201. The first device 100 sends a first SMS to the second device 110. The first SMS may be sent by the application in the first device 100 to the application in the second device 110. This method step 201 may be performed e.g. by, starting the application in the first device 100 and choosing the second device 110 in a phone book in the first device 100.

The first SMS comprises an identity for the second device 110 to use for initiating an IP connection between the first device 100 and the second device 110. In this embodiment when the first device has an IP address, the identity is the public IP address of the first device 100.

The first SMS may further comprise a link to a place, in this example the IP address of the first device 100, where the application can be downloaded into the second device 110 if the second device 110 does not already comprise the application. The link may also be to another place such as a server comprising the application.

The first SMS may further comprise an invitation text to be displayed in the second device 110 if the second device 110 does not already comprise the application. The invitation text is a human readable text inviting the user of the second device 110 to activate the link if he/she wishes to download the application, such as e.g. "the user of the first device wants to send you a picture. Please click on the link below to make that possible http://xxx.vvy.zzz.". This may e.g. be accomplished by the first device 100 addressing the first SMS to a specific port at the second device 110, which port is associated with the application. If the second device 110 comprises that application it has registered that any SMS addressed to that specific port is associated with the application. If the first SMS does not find such a port, it is an indication that the second device 110 does not comprise the application and that the invitation text shall be displayed in the regular SMS inbox in the second device 110 for the user to read.

The first SMS may further comprise a trigger to start the application in the second device 110 if the second device 110 already comprises the application. If the application is already installed in the second device 110, then the application is subscribing to SMS on the specific port as described above, the SMS will be directed towards the application, which will auto-start and neither the first SMS nor the invitation text which were comprised in the first SMS is displayed in the second device 110.

202. If the second device 110 comprises the application, it is started. This may be performed automatically by the trigger comprised in the first SMS mentioned above. The second device 110 then initiates an IP connection between the first device 100 and the second device 110, using the identity, which in this embodiment is represented by the IP address of the first device 100. This may be performed by the application in the second device 110. This may be performed by the application in the first device 100 being contacted by the application in the second device 110.

203. An IP connection is started between of the first device 100 and the second device 110. The first device 100 can start communicate with the second device 110, using the shared application.

204. If the second device 110 does not comprise the application, the invitation text mentioned above may be displayed in the second device 110. The link in the text is activated in the second device 110, if the user of the second device 110 chooses to do so, and the first device 100 is contacted for down load using the link. The link is preferably a link to the application of the second device.

205. The application is then downloaded into the second device 110. The application in the second device 110 is started.

206. The second device 110 then initiates an IP connection between the first device 100 and the second device 110, using the identity, which in this embodiment is represented by the IP address of the first device 100. This may be performed by the application in the second device 110.

207. An IP connection is started between the first device 100 and the second device 110 and the first device 100 can start communicate with the second device 110, using the shared application.

208. In an alternative embodiment, the link to the place where the application can be downloaded, and the invitation text to be displayed in the second device 110 if the second device 110 does not already comprise the application, is not comprised in the first SMS in step 201. Instead a separate invitation SMS comprising the link and the invitation text is sent by the first device 100 to the second device 110, if the second device 110 does not comprise the application. The invitation SMS is referred to as a dashed line 208 in FIG. 2.

The invitation SMS may be a normal SMS containing human readable text and the link, appearing in the second device's 110 normal inbox.

To establish whether the second device 110 comprises the application or not may be performed in the following way. When the first device 100 sends the first SMS to the second device 110 in step 201, the application in the first device 100 expects the application in the second device 110 to take contact. If no contact is taken within a predetermined time period, e.g. 45 seconds, this is an indication that the second device 110 does not comprise the application or that the second device 110 is turned off.

To distinguish between these two cases, the delivery report feature of SMS may be used. The delivery report is a feature where the Short Message Service Centre (SMSC) in a radio communication system notifies the first device 100 of that an SMS has been delivered to the second device 110. If there is no delivery of the SMS to the second device 110, due to the fact that second device 110 is not turned on, then no delivery report is sent from the SMSC to the first device 100. The delivery report is in-itself an SMS, but it does not show up as an SMS on the first device 100. An SMS (in this example the SMS in step 201) that is sent from the first device 100 to the second device 110 comprises a Message Reference Number. This Message Reference Number is also attached to the delivery report that is sent to the first device 100 from the SMSC. Thereby the first device 100 can associate a sent SMS and a delivery report to the same sent SMS.

Instead of using the delivery report feature of SMS, an alternative way of establish whether the second device 110 is turned on or not is to ask the Home Location Register (HLR) of the operator of second device 110, which HLR keeps up with the status whether the second device 110 is turned on or not. The first device 100 may send a request to the operator who owns the SIM card of the second device 110, possibly via the server 120, and ask the operator to find out in its HLR whether the second device 110 is turned on or not.

Therefore, in the first of those two alternatives, the invitation SMS is sent from the first device 100 to the second device 110, if a delivery report associated with the SMS sent in step 201 is received by the first device 100 but no contact with the application in the first device 100 is taken by the application in the second device 110 within a predetermined time period (the second device 110 is turned on but the second device 110 does not comprise the application).

In the second of those two alternatives the invitation SMS is sent from the first device 100 to the second device 110, if the operator upon request has said that the second device 110 is turned on but no contact with the application in the first device 100 is taken by the application in the second device 110 within a predetermined time period (the second device 110 is turned on but the second device 110 does not comprise the application).

Figure 3:
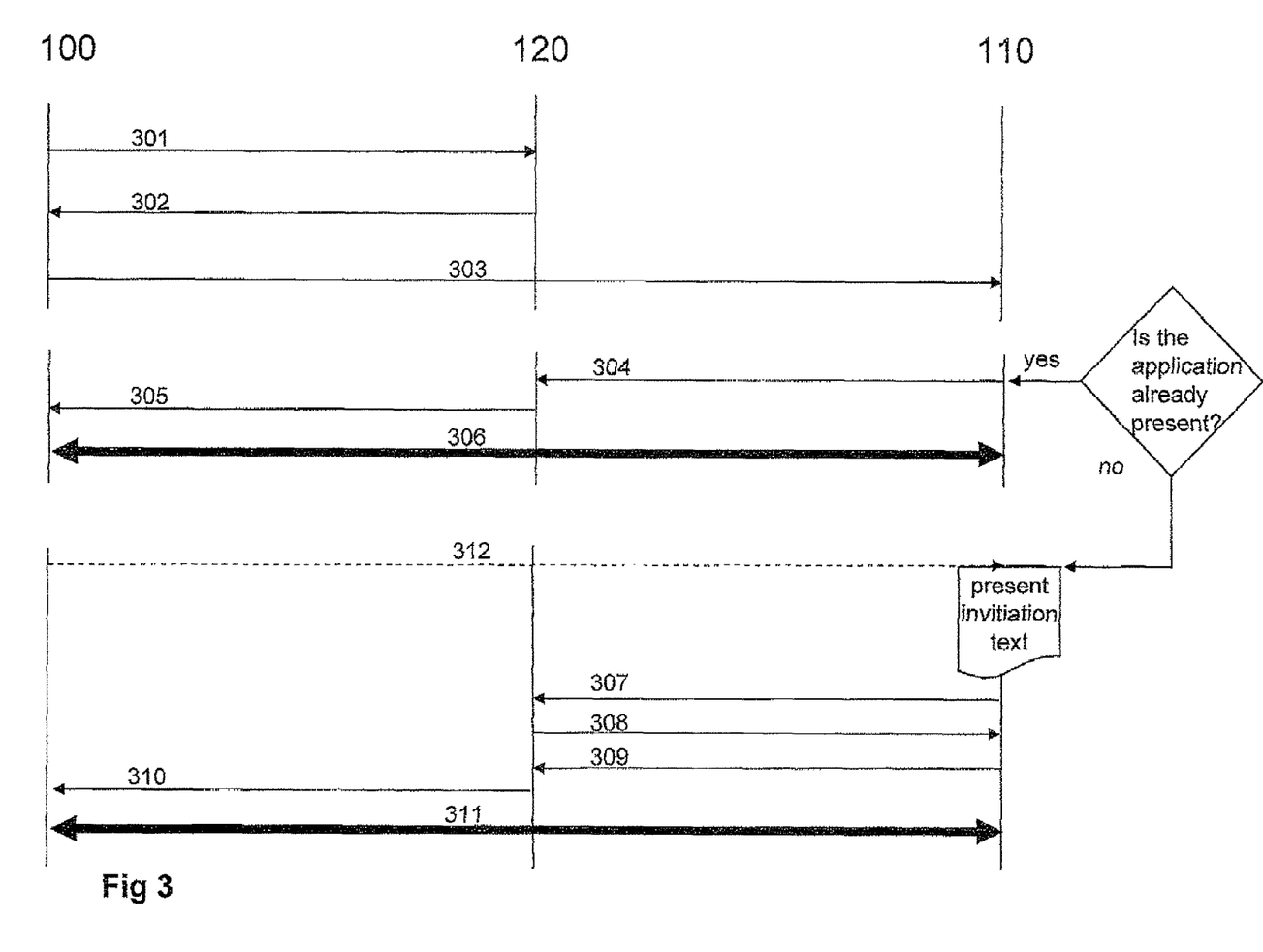
FIG. 3 is a combined signaling scheme and flowchart illustrating another embodiment of the present invention.

FIG. 3 is a combined signaling scheme and flowchart that shows a scenario wherein the first device 100 does not have a public IP address. In this case the first device 100 must contact the second device 110 via the server 120. The application in first device 100 knows the public IP address to the server 120. The method comprises the following steps:

301. The first device 100 connects to of the server 120 by means of the known IP address, for initiating an IP connection between the first device 100 and the server 120. This step may be performed e.g. by, starting the application in the first device 100 and choosing the second device 110 in a phone book in the first device 100, which application then will initiate the connection to the server 120. The initiating of the connection may be performed by the application.

The first device 100 obtains an identity identifying the connection between first device 100 and the server 120, and the connection and its identity is registered in the server 120. In an alternative embodiment, the first device 100 creates the identity identifying the connection between first device 100 and the server 120, and sends the identity and a request to the server 120 to register its connection and its identity in the server 120.

The server 120 may also be informed of the telephone number of the second device 110. It will be explained why later on.

302. The first device 100 receives a response from the server 120, the response comprising the requested identity identifying the connection between the first device 100 and the server 120 if it was requested.

The response may further comprise an invitation text formulated by the server 120 which will be sent by the first device 100 to the second device 110 in the next step. The server 120 may preferably adopt the text to the country code of the second device 110 e.g. +45 equals Denmark, which will be found out by means of the telephone number received in the previous step 301. In that case the response also will comprise the invitation text. The text will only be displayed in the second device 110 if the second device 110 not comprises the application in the same way as described above.

303. The first device 100 sends a first SMS to the second device 110. The first SMS may be sent by the application in the first device 100 to the application in the second device.

The first SMS comprises an identity for the second device 110 to use for initiating an IP connection between the first device and the second device. The identity in this embodiment is represented by the identity identifying the existing connection between first device 100 and the server 120 obtained from the server 120 in step 312.

The first SMS further comprises a link to a place from where the application can be downloaded into the second device 110 if the second device 110 does not already comprise the application. In this example the link may be to the server 120, where the application can be downloaded.

The first SMS may further comprise a trigger to start the application in the second device 110 if the second device 110 already comprises the application in the same way as mentioned above under step 201.

The first SMS may further comprise the invitation text to be displayed in the second device 110 if the second device 110 does not already comprise the application in the same way as mentioned under method step 201. If the response from the server did not comprise any invitation text, such text may be created in the first device 100 preferably by the application.

304. If the second device 110 comprises the application, the application is started by the trigger. The application in the second device knows the IP address of the server 120 as mentioned above. The second device 110 connects to the first device 100 by first setting up a connection using the known IP address of the server 120. This may be performed by the application in the second device 110 connecting to the application in the first device 100.

The second device provides the server 120 with the identity identifying the existing connection between the first device 100 and the server 120, which identity were comprised in the first SMS. The server 120 identifies the existing connection by means of the identity.

305. When the server has identified the connection associated with the identity it sets up an IP connection between the first device 100 and the second device 110, by connecting the connection between the second device 110 and the server 120 with the connection between the first device 100 and the server 120.

306. An IP connection is started between the first device 100 and the second device 110. The first device 100 can start communicate with the second device 110, using the shared application.

307. If the second device 110 does not comprise the application, the invitation text mentioned above is displayed in the second device 110. The link in the text is activated by the user of the second device 110, if the user of the second device 120 chooses to do so, and the second device 110 contacts the place where the application can be downloaded by using the link, which place e.g. may be the server 120.

308. The application is then downloaded into the second device 110. The application in the second device 110 is started.

309. The application downloaded in the second device 110 knows the IP address of the server 120. The second device 110 connects to the first device 100 by first set up a connection to of the server 120, using the known IP address. This may be performed by the application in the second device 110 connecting to the application in the first device 100.

The second device 110 provides the server 120 with the identity identifying the existing connection between the first device 100 and the server 120, which identity were comprised in the first SMS. The server 120 identifies the existing connection by means of the identity.

310. When the server 120 has identified the connection associated with the identity it sets up an IP connection between the first device 100 and the second device 110, by connecting the connection between the second device 110 and the server 120 with the connection between the first device 100 and the server 120.

311. An IP connection is started between the first device 100 and the second device 110. The first device 100 can start communicate with the second device 110, using the shared application.

312. In an alternative embodiment, the link to the place, where the application can be downloaded and the invitation text to be displayed in the second device 110 if the second device 110 does not already comprise the application, is not comprised in the SMS in step 303. Instead a separate invitation SMS comprising the link and the invitation text is sent by the first device 100 to the second device 110, if the second device 110 does not comprise the application, in the same way as described under step 208. The invitation SMS is referred to as a dashed line 312 in FIG. 3.

Therefore, in the first alternative, the invitation SMS is sent from the first device 100 to the second device 110, if a delivery report associated with the SMS sent in step 303 is received by the first device 100 but no contact with the application in the first device 100 is taken by the application in the second device 110 within a predetermined time period (the second device 110 is turned on but the second device 110 does not comprise the application). See more details about this under similar step 208.

In the second alternative the invitation SMS is sent from the first device 100 to the second device 110, if the operator upon request has said that the second device 110 is turned on but no contact with the application in the first device 100 is taken by the application in the second device 110 within a predetermined time period (the second device 110 is turned on but the second device does not comprise the application).

Figure 4:
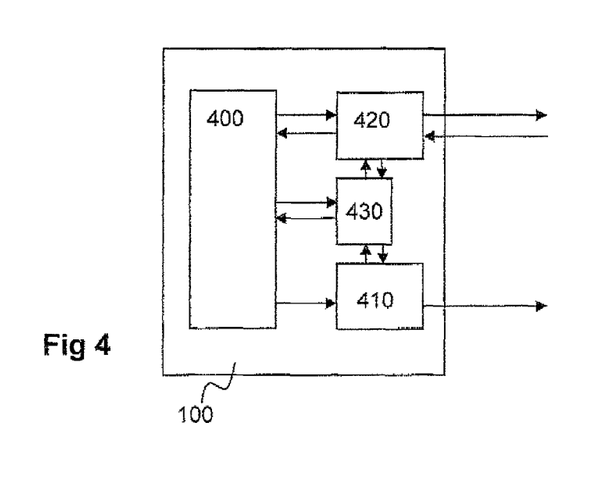
FIG. 4 is a schematic block diagram illustrating a first communication device according to the present invention.

The first device 100, depicted in FIG. 4, comprises the application 400. The first device 100 further comprises the sending unit 410 adapted to send the first SMS to the second device 110. The sending unit 410 may further be adapted to send the first SMS to the specific port in the second device, which port is associated with the application and if the SMS does not find such a port, it is an indication that the second device 110 do not comprise the application and that the invitation text shall be displayed in the second device 110.

The first SMS comprises the link to a place from where the application 400 can be downloaded into the second device 110 if the second device 110 does not already comprise the application 400. The link may be a link to the first device 100 or to the server 120 or any other place where the application may be downloaded. The SMS further comprises an identity for the second device 110 to use for initiating an IP connection between the first device 100 and the second device 110. The first SMS may further comprise an invitation text, which invitation text is adapted to invite the user of the second device 110 to activate the link if he/she wishes to download the application 400. In one embodiment the invitation text is only adapted to be displayed in the second device 110 if the second device 110 does not already comprise the application 400. The first SMS further may comprise a trigger adapted to start the application 400 in the second device 110 if the second device 110 already comprises the application.

The sending unit 410 is further adapted to send a separate invitation SMS to the second device 110 if the second device 110 does not comprise the application 400, said invitation SMS being adapted to comprise the link and the invitation text. In that case the link and the invitation text are not adapted to be comprised in the first SMS. The sending unit 410 may further be adapted to only send the invitation SMS if a delivery report associated with the first SMS is received but no contact with the application 400 in the first device 100 is taken by the application in the second device 110 within a predetermined time period after sending the first SMS. As an alternative the sending unit 410 may only be adapted to send the invitation SMS if an operator of the second device 110 upon request has informed that the second device 110 is turned on but no contact with the application 400 in the first device 100 is taken by the application in the second device 110 within a predetermined time period after sending the first SMS.

The first device 100 further comprises an IP connection point 420 adapted to be connected to by the second device 110 for setting up an IP connection between the first device 100 and the second device 110, which second device 110 is adapted to downloaded the application by means of the link received in the first SMS if the second device 110 did not already comprise the application. The second device 110 is further adapted to connect to the first device 100 by means of the identity received in the first SMS. The identity may e.g. be represented by the IP address of the first device.

In one embodiment the server 120 is used for setting up the IP connection. The application in the first device 100 knows the IP address of the server 120. In that case the identity comprised in the first SMS is represented by an identity identifying an IP connection between the first device 100 and the server 120. The IP connection point 420 is in this embodiment further adapted to set up an IP connection between the server 120 and the first device 100 by means of the known IP address. The IP connection point 420 may be adapted to be used for sending a request to the server 120 requesting the identity identifying the connection between the server 120 and the first device 100 or the first device 100 may create the identity, and which identity being associated with the connection between the server 120 and the first device 100 is registered in the server 120.

The IP connection point 420 may further be adapted to use the IP connection to the server 120 for receiving a response from the server 120. The response comprises the requested identity which identity is intended to be comprised in the first SMS. The server 120 may formulate the invitation text which then may be adapted to be comprised in the response from the server 120.

The IP connection between the first device 100 and the second device 110 is adapted to be performed by the second device 110 setting up a connection between the second device 110 and the server 120. The second device 110 provides the server 120 with the identity, which identity is adapted to be comprised in the first SMS. The identity is adapted to be used by the server 120 for identifying the IP connection between the server 120 and the first device 100 which was registered in the server 120. The server 120 is adapted to connect the identified IP connection between the IP connection point 420 in the first device 100 and the server 120 with the IP connection between the server 120 and the second device 110.

The IP connection point is further adapted to communicate with the second device 110 in an IP connection sharing the application 400.

The present application sharing mechanism can be implemented through one or more processors, such as the processor 430 in the first device 100 depicted in FIG. 4, together with computer program code for performing the functions of the invention. The program code mentioned above may also be provided as a computer program product, for instance in the form of a data carrier carrying computer program code for performing the present method when being loaded into the first device. One such carrier may be in the form of a CD ROM disc. It is however feasible with other data carriers such as a memory stick. The computer program code can furthermore be provided as pure program code on a server and downloaded to the first device 100 remotely.

The present invention is not limited to the above-describe preferred embodiments. Various alternatives, modifications and equivalents may be used. Therefore, the above embodiments should not be taken as limiting the scope of the invention, which is defined by the appending claims.

The invention claimed is:

1. A method in a first communication device for sharing an application with a second communication device, including a first short message service (SMS) inbox, the first device comprising the application, the method comprising:

sending a first SMS message to the second device, where the first SMS message is to be sent to a specific port associated with the application and not associated with the SMS inbox of the second device, the first SMS message comprising:
a link to a location from which the application can be downloaded into the second device if the second device does not already comprise the application,
an identity for the second device to use for initiating an Internet Protocol (IP) connection between the first device and the second device, and
an invitation text to invite a user of the second device to activate the link, the invitation text being displayed in the SMS inbox of the second device, only when the first SMS message cannot be matched to the specific port associated with the application; and connecting to the second device via the IP connection between the first device and the second device, where the second device downloaded the application by means of the link received in the first SMS message if the second device did not already comprise the application and where the second device initiates establishment of the IP connection to the first device by means of the identity received in the first SMS message; and communicating with the second device in the IP connection sharing the application.

2. The method according to claim 1, where the first SMS message further comprises a trigger to start the application in the second device if the second device already comprises the application.

3. The method according to claim 1, where the identity, for the second device to use for initiating the IP connection, is represented by an IP address of the first device.

4. The method according to claim 1, where the link to a place from where the application can be downloaded is a link to the first device.

5. The method according to claim 1, where the link to a place from where the application can be downloaded comprises an IP address of a server.

6. The method according to claim 1, where a server is used for setting up the IP connection,
   where the application knows an IP address of the server, and
   where the identity comprised in the first SMS message is represented by an identity identifying an IP connection between the first device and the server, the method further comprising before sending the first SMS message:
      setting up an IP connection between the server and the first device by using the known IP address of the server; and
      obtaining the identity identifying the connection between the server and the first device, where the identity is to be registered in the server as being associated with the connection between the server and the first device.

7. The method according to claim 6, where the identity is created by the first device.

8. The method according to claim 6, where the identity is obtained from the server upon request.

9. The method according to claim 6, where the connecting to the second device via an IP connection between the first device and the second device includes:
   setting up an IP connection between the second device and the IP address of the server, where the second device provides the server with the identity, where the identity is used by the server for identifying the IP connection between the server and the first device, which was registered in the server, and
   connecting the identified IP connection between the first device and the server with the IP connection between the server and the second device.

10. The method according to claim 6, where the server formulates invitation text to invite a user of the second device to activate the link and stores the invitation text in a response from the server, where the invitation text is comprised in the first SMS message.

11. The method according to claim 10, where the server is informed of a telephone number of the second device and where the server adapts the invitation text to a country code of the telephone number.

12. A first communication device comprising an application, the first device further comprising:
   a sending unit to send a first short message service (SMS) message to a second communication device, including an SMS inbox, where the first SMS message is to be sent to a specific port associated with the application and not associated with the SMS inbox of the second device, the first SMS message comprising:
      a link to a place from where the application can be downloaded into the second device if the second device does not already comprise the application,
      an identity for the second device to use for initiating an Internet Protocol (IP) connection between the first device and the second device, and
      an invitation text to invite a user of the second device to activate the link, the invitation text being displayed in the SMS inbox of the second device, only when the first SMS message cannot find the specific port associated with the application; and
   an IP connection point to be connected to by the second device, where the IP connection enables the second device to download the application by means of the link received in the first SMS message if the second device does not already comprise the application and enables the second device to initiate establishment of the IP connection to the first device by means of the identity received in the first SMS message,
   where the IP connection point further is to communicate with the second device in the IP connection sharing the application.

13. First device according to claim 12, where the first SMS message further comprises a trigger adapted to start the application in the second device if the second device already comprises the application.

14. The first communication device according to claim 12, where said identity, intended for the second device to address for initiating an IP connection, is represented by an IP address of the first device.

15. The first communication device according to claim 12, where the link to a place from where the application can be downloaded is a link to the first device.

16. The first communication device according to claim 12, where the link to a place from where the application can be downloaded comprises an IP address of a server.

17. The first communication device according to claim 12, where a server is used for setting up the IP connection,
   where the application knows an IP address of the server,
   where the identity comprised in the first SMS message is represented by an identity identifying an IP connection between the first device and the server, and
   where the IP connection point further is to set up an IP connection between the server and the first device by using the known IP address of the server and which identity is to be registered in the server as being associated with the connection between the server and the first device.

18. The first communication device according to claim 17, where the identity is created by the first device.

19. The first communication device according to claim 17, where the identity is obtained from the server upon request.

20. The first communication device according to claim 17, where the IP connection between the first device and the second device is created by the second device setting up an IP connection between the second device and the IP address of the server, where the second device provides the server with the identity, which IP address and identity were comprised in the first SMS message, which identity is used by the server for identifying the IP connection between the server and the first device which was registered in the server, and the server connecting the identified IP connection between the first device and the server with the IP connection between the server and the second device.

21. The first communication device according to claim 17, where the server formulates invitation text to invite a user of the second device to activate the link and stores the invitation text in a response from the server, where the invitation text is comprised in the first SMS message.

* * * * *